(12) United States Patent
Chelba et al.

(10) Patent No.: US 7,478,038 B2
(45) Date of Patent: Jan. 13, 2009

(54) LANGUAGE MODEL ADAPTATION USING SEMANTIC SUPERVISION

(75) Inventors: Ciprian Chelba, Seattle, WA (US); Milind Mahajan, Redmond, WA (US); Alejandro Acero, Bellevue, WA (US); Yik-Cheung Tam, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 10/814,906

(22) Filed: Mar. 31, 2004

(65) Prior Publication Data

US 2005/0228641 A1    Oct. 13, 2005

(51) Int. Cl.
 *G06F 17/21* (2006.01)
(52) U.S. Cl. .............................. 704/10; 704/255; 704/9
(58) Field of Classification Search .................. 704/9, 704/10, 1, 4, 251, 255, 257, 250
See application file for complete search history.

(56) References Cited

U.S. PATENT DOCUMENTS

| | | | | |
|---|---|---|---|---|
| 5,258,909 | A | 11/1993 | Damerau et al. | 715/533 |
| 5,267,345 | A | 11/1993 | Brown et al. | 704/255 |
| 5,444,617 | A | 8/1995 | Merialdo | 704/9 |
| 5,467,425 | A | 11/1995 | Lau et al. | 704/243 |
| 6,188,976 | B1 * | 2/2001 | Ramaswamy et al. | 704/9 |
| 6,640,207 | B2 * | 10/2003 | Witschel | 704/9 |
| 7,275,033 | B1 | 9/2007 | Zhao | |

FOREIGN PATENT DOCUMENTS

| | | |
|---|---|---|
| EP | 0805434 | 11/1997 |
| WO | WO 02/29783 | 4/2002 |

OTHER PUBLICATIONS

C. Crespo, D. Tapias, G. Escalada, and J. Alvarez, 1997, "Language Model Adaptation for Conversational Speech Recognition Using Automatically Tagged Pseudo-Morphological Classes," In Proceedings of the IEEE International Conference on Acoustics, Speech and Signal Processing, vol. 2, pp. 823-826.

Renato DeMori and Marcello Federico, 1999, "Language Model Adaptation," In K. Ponting, editor, Computational Models of Speech Pattern Processing, pp. 280-303, Springer Verlag, Berlin, New York.

Frederick Jelinek and Robert Mercer, 1980, "Interpolated Estimation of Markov Source Parameters from Sparse Data," In E. Gelsema and L. Kanal, editors, Pattern Recognition In Practice, pp. 387-397.

F. Jelinek, B. Merialdo, S. Roukos, and M. Strauss, 1991, "A Dynamic Language Model for Speech Recognition," In Proceedings of Speech and Natural Language DARPA Workshop, pp. 293-295.

(Continued)

*Primary Examiner*—Huyen X. Vo
(74) *Attorney, Agent, or Firm*—Steven M. Koehler; Westman, Champlin & Kelly, P.A.

(57) ABSTRACT

A method and apparatus are provided for adapting a language model. The method and apparatus provide supervised class-based adaptation of the language model utilizing in-domain semantic information.

13 Claims, 4 Drawing Sheets

OTHER PUBLICATIONS

S. Mori, M. Nishimura, and N. Itoh, 2003, "Language Model Adaptation Using Word Clustering," In Proceedings of the European Conference on Speech Communication and Technology, pp. 425-428.

H. Erdongan, "Semantic Structural Language Models," ICSLP 2002 Proceedings.

Cyril Allauzen, Mehryar Mohri, and Brian Roard, 2003, "Generalized Algorithms for Constructing Language Models," To appear in Proceedings of the 41st Annual Meeting of the Association for Computational Linguistics (ACL).

J. Zhang et al., "Improvements in Audio Processing and Language Modeling in the CU Communicator," Eurospeech 2001.

Ward, et al, A class based language model for speech recognition, Proceedings of the Acoustics, Speech, and Signal Processing, 1996. on Conference Proceedings., 1996 IEEE International Conference—vol. 01, pp. 416-418 , Year of Publication: 1996.

Unsupervised class-based language model adaptation for spontaneous speech recognition, Yokoyama, T.; Shinozaki, T.; Iwano, K.; Furui, S.,Acoustics, Speech, and Signal Processing, 2003. Proceedings. (ICASSP apos;03). 2003 IEEE International Conference,vol. 1, Issue , Apr. 6-10, 2003 pp. I-236 - I-230 vol. 1,Digital Object Identifier.

Official Search Report of the European Patent Office in counterpart foreign application No. 05102379.4 filed Mar. 24, 2005.

Dempster, A.P., et al., "Maximum Likelihood from Incomplete Data Via the EM Algorithm," Journal of the Royal Statistical Society, vol. 39 of B, pp. 1-38, 1977.

Paul, D.B., et al, "The Design for the Wall Street Journal-Based CSR Corpus," Proceedings of the DARPA SLS Workshop, Feb. 1992.

Seymore, K., et al., "Scalable Back-Off Language Models," Proceedings ICSLP, vol. 1, pp. 232-235, Philadelphia, 1996.

Stolcke, A., "Entropy-Based Pruning of Back-Office Language Models," Proceedings of News Transcription and Understanding Workshop, pp. 270-274, Lansdowne, VA 1998, DARPA.

S. Katz, "Estimation of Probabilities From Sparse Data for the Language Model Component of a Speech Recognizer," In *IEEE Transactions on Acoustics, Speech and Signal Processing*, vol. 35, pp. 400-401, Mar. 1987.

Deleted Interpolation And Density Sharing For Continuous Hidden Markov Models (1996), X. D. Huang, Mei-Yuh Hwang, Li Jiang, Milind Mahajan, Proc. ICASSP '96.

Speech Utterance Classification Model Training without Manual Transcriptions, Ye-Yi Wang Lee, J. Acero, A., Speech Technol. Group, Microsoft Res., Redmond, WA; This paper appears in: Acoustics, Speech and Signal Processing, 2006. ICASSP 2006 Proceedings. 2006 IEEE International Conference on Publication Date: May 14-19, 2006, vol. 1, On p. I-I Location: Toulouse.

*Improved Katz Smoothing for Language Modeling in Speech Recognition*, Genqing WU, et al., International Conference on Spoken Language Processing 2002, pp. 925-928, Sep. 16-20.

MAP adaptation of stochastic grammars Michiel Bacchiani et al., Center for Spoken Language Understanding, Department of CS&EE, OGI School of Science & Engineering at Oregon Health & Science University, 20000 NW Walker Road, Beaverton, OR 97006, USA, Copyright © 2004.

\* cited by examiner

LANGUAGE MODEL ADAPTATION USING SEMANTIC SUPERVISION

BACKGROUND OF THE INVENTION

The present invention relates to language models used in language processing. In particular, the present invention relates adapting language models for a desired domain.

Language processing systems such as automatic speech recognition (ASR) often must deal with performance degradation due to errors originating from mismatch between the training and test data and actual domain data. As is well known, speech recognition systems employ an acoustic model and a statistical language model (LM) to provide recognition. Adaptation of the acoustic model to a new domain has been addressed with limited success; however, adaptation of the language model has not achieved satisfying results.

The statistical language model (LM) provides a prior probability estimate for word sequences. The LM is an important component in ASR and other forms of language processing because it guides the hypothesis search for the most likely word sequence. A good LM is known to be essential for superior language processing performance.

Commonly, the LM uses smoothed n-gram statistics gathered from a large amount of training data expected to be similar to the test data. However, the definition of similarity is loose and it is usually left to the modeler to decide, most of the time by trial and error, what data sources should be used for a given domain of interest.

Invariably, mismatch exists between the training or test data and the actual domain or "in-domain" data, which leads to errors. One source of mismatch comes from the out-of vocabulary words in the test data. For example, an air travel information system originally designed for one airline may not work well for another due to the mismatch in city names, airport names, etc. served by the company in question.

Another potential source of mismatch comes from different language style. For example, the language style in the news domain is different from the air travel information domain. A language model trained on newswire or other general text may not perform very well in an air travel information domain.

Although various approaches have been tried to adapt a LM trained on a large amount of background data using different techniques, none have achieved superior results, and thus improvements in LM adaptation are continually needed. A method that addresses one or more of the problems described above would be helpful.

SUMMARY OF THE INVENTION

A method and apparatus are provided for adapting a language model. The method and apparatus provide supervised class-based adaptation of the language model utilizing in-domain semantic information.

Generally, resources used to perform adaptation are derived from background data indicative of general text and a set of semantic entities used in the selected domain and organized in classes. In a further embodiment, adaptation data indicative of a selected domain to be modeled is also used.

In said further embodiment such data comprises background n-gram class count data correlated to the classes of the set of semantic entities and based on background data indicative of general text, and adaptation n-gram class count data correlated to the classes of the set of semantic entities and based on adaptation data indicative of a selected domain to be modeled. From this data and using the set of semantic entities, background word count data and adaptation word count data can be computed and used as a basis for adapting the language model to the domain of the adaptation data and the set of semantic items.

DETAILED DESCRIPTION OF ILLUSTRATIVE EMBODIMENTS

The present invention relates to a system and method for language model adaptation. However, prior to discussing the present invention in greater detail, one illustrative environment in which the present invention can be used will be discussed.

Figure 1:
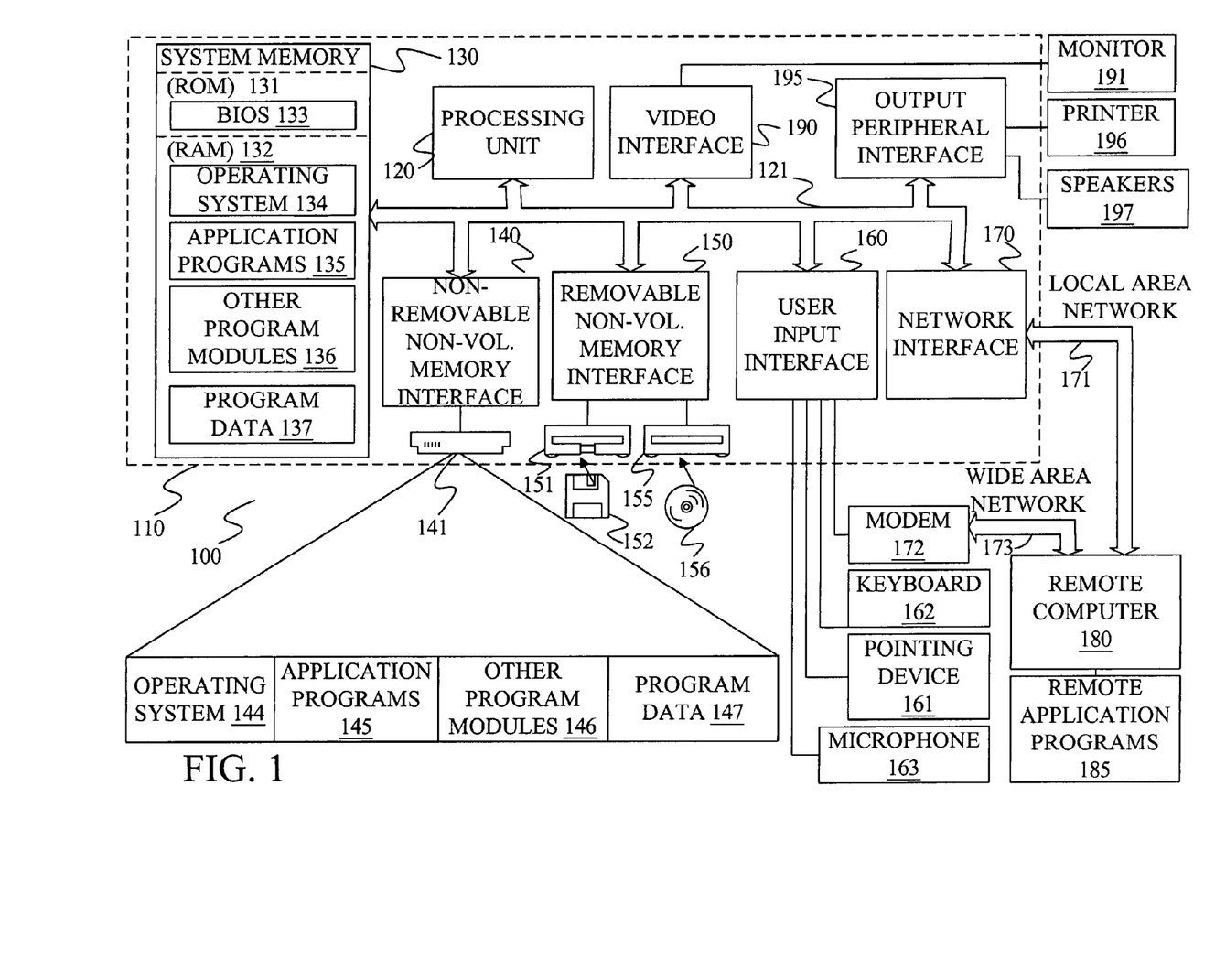
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

As indicated above, the present invention relates to a system and method for language model adaptation. Resources used to perform adaptation include a background LM that needs to be adapted. Commonly, the background LM is obtained from a large corpus of background training data such as but not limited to news articles and the like. The background training data is used to obtain the n-gram statistics for a background language model.

A semantic database or semantic information provides supervised information for adaptation. For the purposes of this discussion, the semantic database broadly and schematically represents a list of semantic entities—classes—each accompanied by a list of realizations assumed to be in the same form that they are encountered in in-domain natural language text. For example, the semantic database can be in the form of a list of semantic entities generally well defined for a plurality of classes. For instance, and as used as an example below, the semantic items for a language model used in speech recognition by an airline for obtaining travel information to make reservations, may include a list of the cities served by the airline and the various airports that are flown to. Another example of semantic entities and classes can be a list of employees of a company, days of the month, and months of the year, which would possibly be included in an in-domain for scheduling application.

Semantic classes can be classified into open and closed classes. Class members in open classes changes across domains, while those in closed classes do not change. For instance, the semantic classes in an air travel application could be as follows:

Open classes: {AIRLINE, AIRPORT, CITY, STATE}
Closed classes: {DAYS, MONTH, INTERVAL, CLASS OF SERVICE, TIME ZONE, FOOD SERVICE, GROUND SERVICE}

From application to application the number and types of semantic classes may change significantly. However, in some applications, such as an airline travel application, once the semantic classes have been identified, only the semantic entities or word level realizations, may be all that may need to be changed to essentially adapt the language model for use by another airline.

An optional third resource used in language model adaptation is adaptation data. Adaptation data comprises actual or in-domain data in the form of sentences, phrases, text segments or the like that can serve as examples for usage of the classes in the in-domain application. Compared to the background data, the adaptation data is usually many orders of magnitude less than the background data. In one embodiment, the in-domain data is sub-divided into adaptation development data and adaptation training data. The adaptation training data is combined with the background training set to become a larger training set, with the n-gram counts from both sets are mixed with equal weight (other mixing schemes are possible though: the n-gram counts can be mixed with different weight, such as in MAP adaptation). The adaptation development data is used strictly for smoothing both the background and the adapted language models. N-grams from the development set are not included into the background/adapted language model.

In the exemplary embodiment, all data sets are word-level natural language text.

Class-Based Adaptation

Supervised semantic information is incorporated into the language model through the use of a class-based language model. Briefly, the probability estimate of a new word $w_3$ belonging to a single semantic class $c_3$ can be done as follows:

$$Pr(w_3|w_2w_1) = Pr(w_3|c_3) \cdot Pr(c_3|w_2w_1) \quad (1)$$

under the modeling assumption that $Pr(w_3|c_3w_2w_1) = Pr(w_3|c_3)$

For example, Pr(city name|fly to) is estimated using:

$$Pr(\text{city name}|\text{fly to}) = Pr(\text{city name}|\text{CITY}) \cdot Pr(\text{CITY}|\text{fly to})$$

where Pr(CITY|fly to) is estimated using the training data tagged with semantic classes, while Pr(city name|CITY) is adapted using an in-domain semantic database. If prior in-domain knowledge is available, common city names can be assigned with higher probabilities than uncommon ones; otherwise, a uniform distribution of the city names is assumed. The advantages of using a class based adaptation approach are:

Probability of a semantic class given the word context may be well-estimated. In the above example, Pr(CITY|fly to) may be very similar in training and adaptation data;

Fast LM adaptation can be performed by adapting $Pr(w_3|c_3)$ using an in-domain semantic database. The adapted probabilities $Pr(w_3|c_3)$ are combined with the counts "$w_1w_2w_3$" without collecting any new training text to re-train the domain-specific language model; and Probability estimation with a wider word context can be achieved since word phrases are encapsulated in semantic classes. For example, the 5-gram "los angeles to new york" is modeled as a class trigram "CITY to CITY" which is more intuitively satisfying than being modeled as a sequence of trigrams "los angeles to", "angeles to new" and "to new york".

Adaptation Procedure

Figure 2:
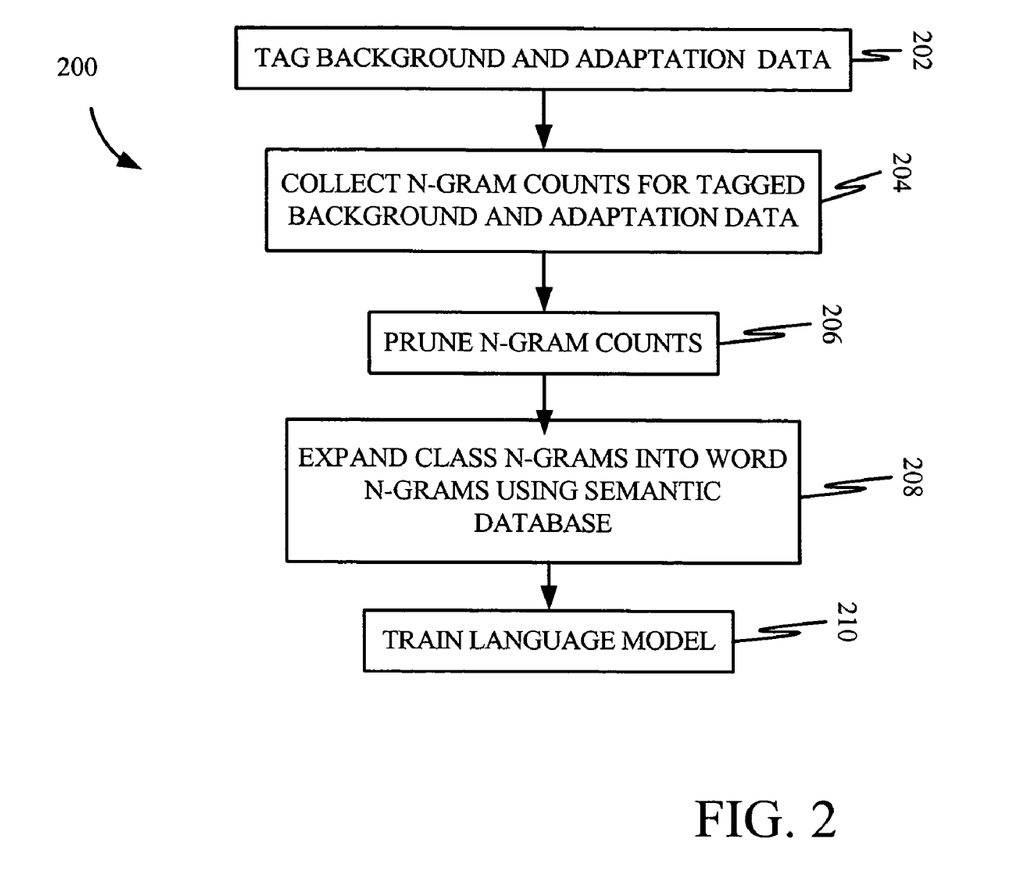
FIG. 2 is a flow diagram for adapting a language model.
Figure 3A:
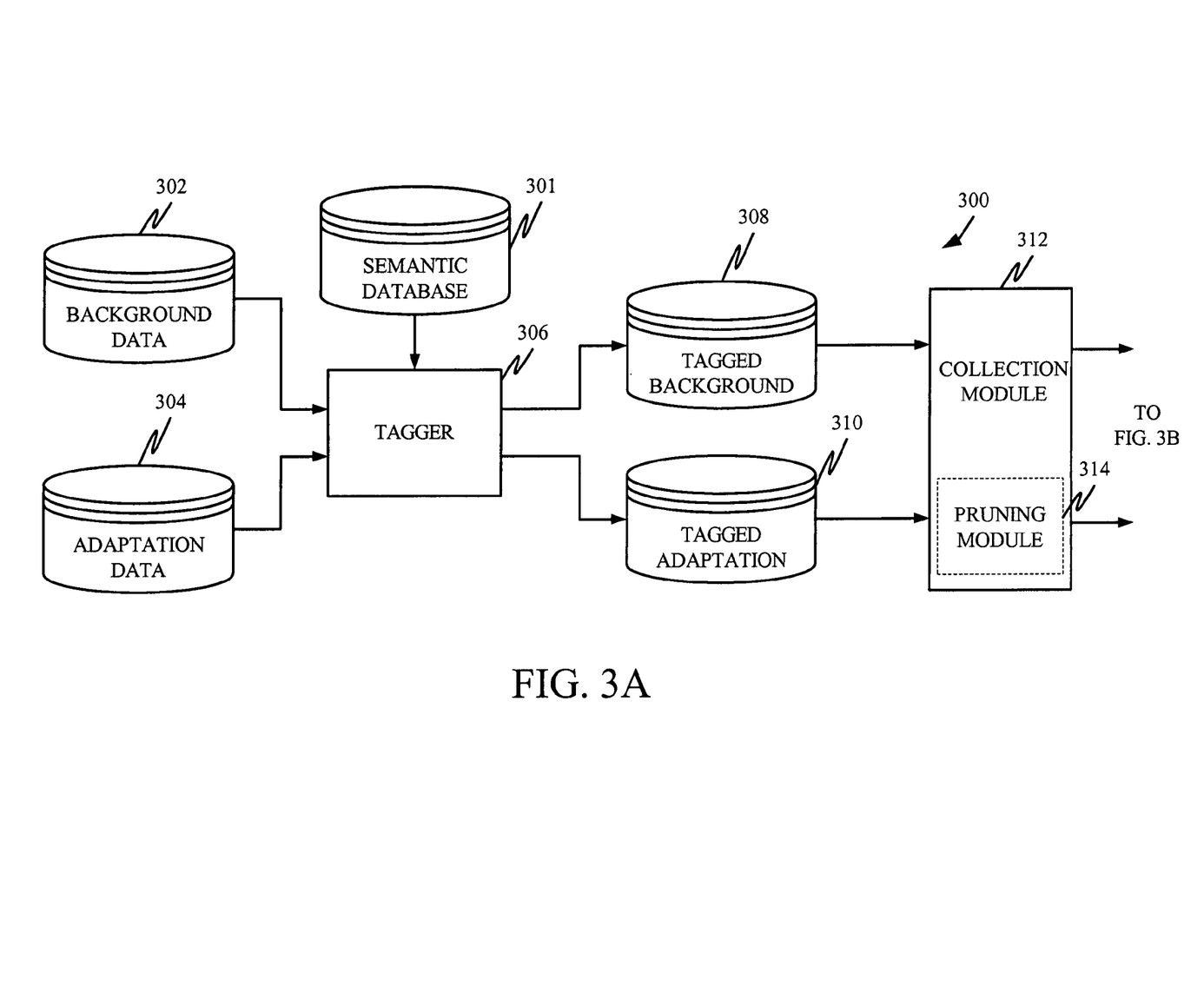
FIGS. 3A and 3B illustrate a block diagram of a system for adapting a language model.
Figure 3B:
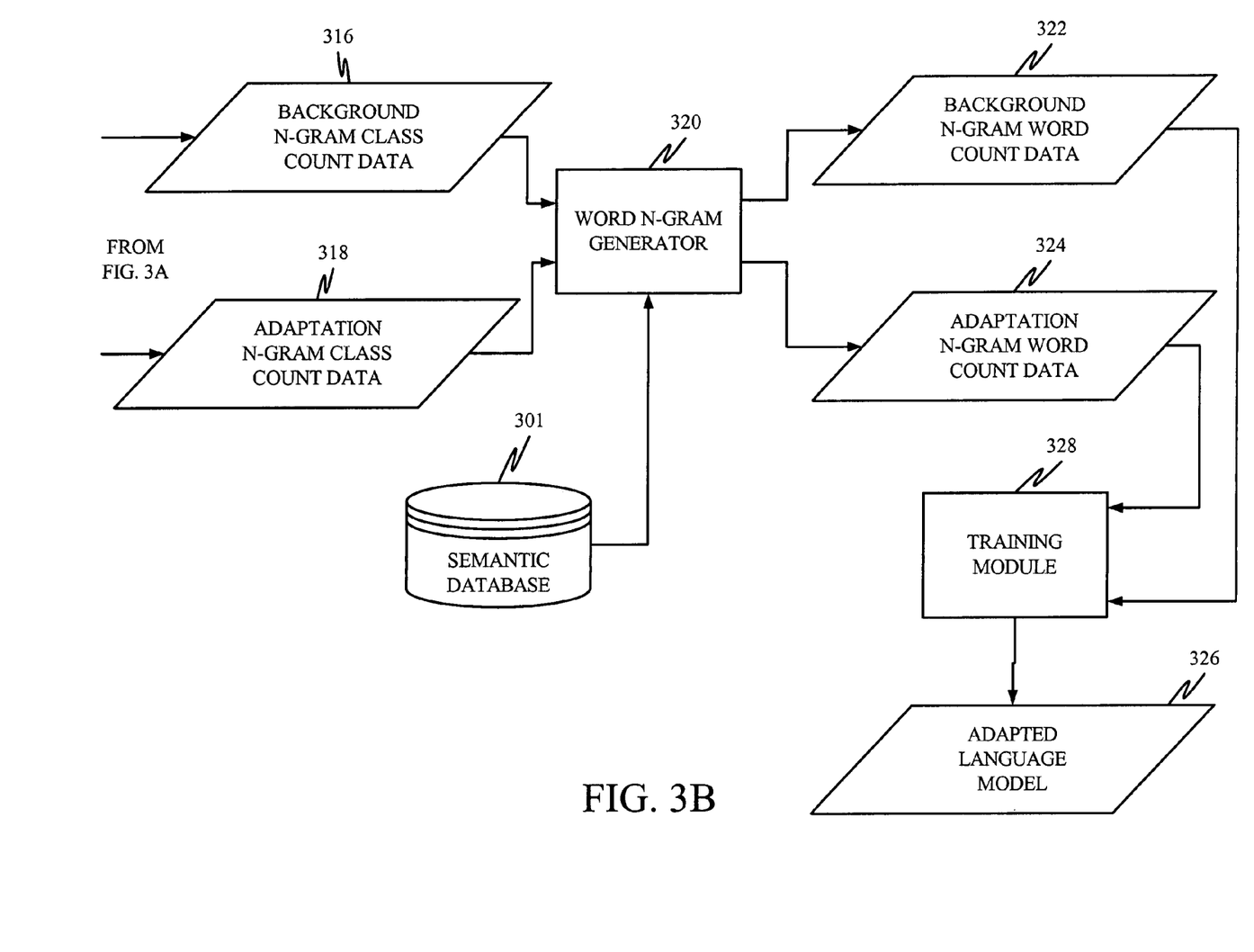

FIG. 2 illustrates an exemplary adaptation procedure 200. FIGS. 3A and 3B illustrate and exemplary system 300 for performing the procedure 200. As indicated above, use of the adaptation data is optional, but a further embodiment of the present invention. An embodiment using both will be described below, but it should not be considered required or limiting. Also, before proceeding it should be noted that procedure 200 and system 300 are described as operating on background data and optional adaptation data generally at the same time. However, this is for purposes of simplicity of understanding and should not be considered as necessary or limiting.

Step 202 generally represents obtaining tagged data for both the background data and the adaptation data. In the embodiment illustrated this includes tagging word level data as indicated at 202. In particular, the training (background and adaptation) data is first tagged with semantic class labels at step 202 in FIG. 2. Of course, if tagged data is present, this step is not necessary. In FIG. 3A, semantic database is indicated at 301, while training data resides in corpuses 302 and 304 and where tagging is performed by tagger 306.

Tagger 306 modifies the word level text provided by corpuses 304 and 306 and adds tags indicative of classes for the semantic entities recognized therein. For example, given "fly from san francisco to" and knowing that "san francisco" belongs to the semantic class "CITY", the output from tagger 306 will be "fly from CITY to". The word level training data with some of the semantic entities replaced with corresponding semantic classes is indicated at 308 and 310.

In one embodiment, heuristics can be applied for tagging. Such heuristics can include a simple string-matching approach for tagging. The tagger 306 matches a given database entry with sequences of words in the text and assigns a class label to the longest phrase thus identified. In a further embodiment, if word ambiguity occurs between different classes, the word phrase is left un-tagged. In another embodiment, soft tagging could be performed by assigning probabilities to each semantic class candidate.

After tagging has been performed in step 202, if tagged data is not otherwise provided, the procedure continues with step 204 to collect class n-gram counts from all training text, or otherwise count the unique n-grams contained in the tagged data. In FIG. 3A, this step is performed by collection module 312.

An optional step 206 comprising pruning the class n-gram counts can be performed if necessary. In class-based adaptation, the size of the language model is strongly influenced by the number of elements in each semantic class when class n-grams are expanded to word n-grams. For instance, a class trigram "PERSON joins COMPANY", where "PERSON" and "COMPANY" comprise semantic classes, generates millions of word trigrams when "PERSON" and "COMPANY" each contain thousands of class elements. Therefore, language model pruning may be necessary to make the size of the language model manageable. In one embodiment, N-grams containing more than one semantic class are discarded. If computational resources are available, they could be retained. Additionally, count cutoff pruning of class n-grams can be employed before expanding into word n-grams. In FIG. 3A, collection module 312 is illustrated as performing this function by using pruning module 314. The output from collection module 312 comprises background N-gram count data 316 and adaptation n-gram count data 318 illustrated in FIG. 3B.

At step 208, class n-grams are expanded into word n-grams using the semantic database 301. In FIG. 3B, this step is performed by word n-gram generator 320. In one embodiment, word n-gram generator 320 can implement the following expansion algorithm, generating background n-gram word count data 322 and adaptation n-gram word count data 324:

(a) Given a class n-gram, replace a class tag by each of its class elements.
For instance, the class trigram "analyst for COMPANY could create a word 4-gram "analyst for x. y." where "x. y." is a company name (e.g. Verizon Wireless) in the semantic database.

(b) Compute the word n-gram counts from the class n-gram counts.
A word n-gram count is computed as a fraction of its corresponding class n-gram count depending on Pr(word|class).
Suppose the probabilities for the semantic class "COMPANY", were:
Pr(microsoft|COMPANY)=0.5
Pr(oracle|COMPANY)=0.25
Pr(verizon wireless|COMPANY)=0.25, and
the n-gram "analyst for COMPANY" was 5 counts,
then, the word level n-gram count data would be:
"analyst for Microsoft"=2.5
"analyst for oracle"=1.25
"analyst for verizon wireless"=1.25
In the above example, the count of the generated word 4-gram "analyst for x. y." is equal to: #("analyst for COMPANY")•Pr("x. y."|COMPANY)

(c) However, note the class based n-gram may generate word level n-grams that are not operable with training a particular n-gram due to multi-word semantic entries. For instance, suppose a 3-word n-gram language model is desired, then "analyst for verizon wireless" is not of the right form. In this situation, lower order word n-grams using a sliding window are generated. In the example above, "analyst for verizon" would have a count of 1.25 as well as "for verizon wireless" would have a count of 1.25.

If however, the class appears anywhere else in the n-gram, i.e., other than the right-most position, the following steps can be performed to avoid double counting for multi-word semantic item expansion. As with the previous example, step (a) regarding expansion and step (b) regarding computation are performed in the same manner. However, step (c) is not performed, rather the context of the n-gram is shortened by taking only the desired right-most number of words after the expansion.

By way of example, assume a class trigram for "COMPANY analyst said" having a count 5 with the same probabilities for the semantic class "COMPANY" of:
Pr(microsoft|COMPANY)=0.5
Pr(oracle|COMPANY)=0.25
Pr(verizon wireless|COMPANY)=0.25 then, the word level n-gram count data would be:
"Microsoft analyst said"=2.5
"oracle analyst said"=1.25
"wireless analyst said"=1.25 where "wireless analyst said" was realized by taking only the three right-most words for a trigram.

Although illustrated where semantic database 301 is operable with tagger 306 and word n-gram generator 320, it should be understood that the content in each of the instances of database 301 can be, and in many applications is different, which may render the method more useful.

At step 210, the language model 326 is trained using the generated word n-gram counts of the background and optional adaptation data, herein performed by training module 328. If desired, count cutoff pruning on the word n-grams can be performed to further reduce the size of the language model.

Training can include smoothing the n-gram relative frequency estimates. For instance, the deleted-interpolation method described by Frederick Jelinek and Robert Mercer in "Interpolated Estimation of Markov Source Parameters from Sparse Data," In E. Gelsema and L. Kanal, editors, *Pattern Recognition in Practice*, pages 381-397, 1980 which is hereby incorporated by reference, can be used for smoothing the n-gram relative frequency estimates. Briefly, the recursive deleted-interpolation formula is defined as follows:

$$Pr_I(w \mid w_1^{n-1}) = (1 - \lambda_{w_1^{n-1}}) \cdot f(w \mid w_1^{n-1}) + \lambda_{w_1^{n-1}} \cdot Pr_I(w \mid w_2^{n-1})$$

$$Pr_I(w) = (1 - \lambda) \cdot f(w) + \lambda \cdot \frac{1}{V}$$

where $f(w \mid w_{1_k}^{n-1})$ denotes the relative frequency of a word n-gram and $w_{1_k}^{n-1}$ is the word history which spans the previous n−1 words. N-gram models of different context orders plus the uniform word distribution $$\frac{1}{V}$$

are linearly interpolated. The interpolation weights $\lambda_{w_1^{n-1}}$ can be estimated using well known maximum likelihood techniques. Due to the data sparsity, interpolation weights are usually tied to reduce the number of estimation parameters by grouping the word context into classes. One possible way is to bucket the parameters based on the number of occurrence of a given word context.

Step 210 completes the supervised language model adaptation, providing, in this example a deleted-interpolated language model. Implementation of the deleted-interpolated language model in a language processing system can include conversion to a backoff language model in standard ARPA format. Co-pending application Ser. No. 10/810,254 entitled "REPRESENTATION OF A DELETED INTERPOLATION N-GRAM LANGUAGE MODEL IN ARPA STANDARD FORMAT", filed on Mar. 26, 2004, describes one example of converting to the ARPA format, which can be employed in a one pass system.

Although the present invention has been described with reference to particular embodiments, workers skilled in the art will recognize that changes may be made in form and detail without departing from the spirit and scope of the invention.

What is claimed is:

1. A method of adapting an n-gram language model for a new domain, the method comprising:
   receiving background data indicative of general text phrases not directed to the new domain;
   receiving a set of semantic entities used in the new domain and organized in classes;
   generating background n-gram class count data based on the background data and the semantic entities and classes thereof;
   receiving adaptation data indicative of text phrases used in the new domain;
   generating adaptation n-gram class count data based on the adaptation data and the semantic entities and classes thereof;
   training a language model based on the background n-gram class count data and the adaptation n-gram class count data; and
   embodying the language model in tangible form.

2. The method of claim 1 and further comprising:
   generating background n-gram word data based on the background n-gram class count data and the semantic entities and classes thereof;
   generating adaptation n-gram word data based on the adaptation n-gram class count data and the semantic entities and classes thereof; and
   wherein training the language model based on the background n-gram class count data and the adaptation n-gram class count data comprises using background n-gram class count data and adaptation n-gram word data.

3. The method of claim 2 wherein generating background n-gram word data comprises generating background n-gram word data for multi-word semantic entities with each data entry comprising a selected number of words.

4. The method of claim 3 wherein generating adaptation n-gram word data comprises generating adaptation n-gram word data for multi-word semantic entities with each data entry comprising a selected number of words.

5. The method of claim 4 wherein generating adaptation n-gram class count data based on the adaptation data and the semantic entities and classes thereof comprises tagging word level adaptation data based on the semantic entities and classes thereof.

6. The method of claim 5 wherein generating adaptation n-gram class count data based on the adaptation data and the semantic entities and classes thereof comprises counting unique class level n-grams of the tagged adaptation data.

7. The method of claim 6 wherein generating adaptation n-gram class count data based on the adaptation data and the semantic entities and class thereof comprises discarding some class n-grams from the tagged adaptation data.

8. The method of claim 3 wherein generating background n-gram class count data based on the background data and the semantic entities and classes thereof comprises tagging word level background data based on the semantic entities and classes thereof.

9. The method of claim 8 wherein generating background n-gram class count data based on the background data and the semantic entities and classes thereof comprises counting unique class level n-grams of the tagged background data.

10. The method of claim 9 wherein generating background n-gram class count data based on the background data and the semantic entities and classes thereof comprises discarding some class n-grams from the tagged background data.

11. The method of claim 2 and further comprising:
    wherein generating background n-gram word data comprises generating background n-gram word data for multi-word semantic entities with each data entry comprising a selected number of words;
    wherein generating adaptation n-gram word data comprises generating adaptation n-gram word data for multi-word semantic entities with each data entry comprising a selected number of words;
    wherein generating background n-gram class count data based on the background data and the semantic entities and classes thereof comprises tagging word level background data based on the semantic entities and classes thereof; and
    wherein generating adaptation n-gram class count data based on the adaptation data and the semantic entities and classes thereof comprises tagging word level adaptation data based on the semantic entities and classes thereof.

12. A computer-readable storage medium having computer-executable instructions for performing steps to generate a language model, the steps comprising:
    receiving a set of semantic entities used in a selected domain and organized in classes;
    receiving background n-grams class count data correlated to classes of the set of semantic entities and based on background data indicative of general text;
    receiving adaptation n-gram class count data correlated to classes of the set of semantic entities and based on adaptation data indicative of a selected domain to be modeled;
    training a language model based on the background n-gram class count data, the adaptation n-gram class count data and the set of semantic entities; and
    wherein training the language model comprises computing background word count data based on the background n-gram class count data and the set of semantic entities, computing adaptation word count data based on the adaptation n-gram class count data and the set of semantic entities, and smoothing the n-gram relative frequencies.

13. The computer-readable storage medium of claim 12 wherein smoothing comprises using a deleted-interpolation algorithm.

* * * * *